(12) United States Patent
Fleig et al.

(10) Patent No.: US 8,172,500 B2
(45) Date of Patent: May 8, 2012

(54) TURBINE, IN PARTICULAR FOR AN EXHAUST-GAS TURBOCHARGER, AND EXHAUST-GAS TURBOCHARGER

(75) Inventors: Claus Fleig, Asperg (DE); Matthias Stein, Korntal-Münchingen (DE); Andreas Wengert, Auenwald (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 648 days.

(21) Appl. No.: 12/356,832

(22) Filed: Jan. 21, 2009

(65) Prior Publication Data
US 2009/0257867 A1 Oct. 15, 2009

(30) Foreign Application Priority Data
Jan. 21, 2008 (DE) .......................... 10 2008 005 405

(51) Int. Cl.
*F04D 29/58* (2006.01)
*F04D 29/56* (2006.01)
(52) U.S. Cl. .................. 415/55.3; 415/55.2; 415/57.3; 415/149.1; 415/160
(58) Field of Classification Search ............. 415/160
See application file for complete search history.

(56) References Cited

U.S. PATENT DOCUMENTS

| 6,951,450 B1 * | 10/2005 | Figura et al. ............ 417/407 |
| 7,600,379 B2 * | 10/2009 | Fledersbacher et al. ...... 60/602 |
| 2006/0062663 A1 * | 3/2006 | Figura et al. ............ 415/160 |

* cited by examiner

*Primary Examiner* — Benjamin Sandvik
*Assistant Examiner* — Joseph Schoenholtz
(74) *Attorney, Agent, or Firm* — Rader, Fishman & Grauer PLLC

(57) ABSTRACT

The invention relates to a turbine, in particular of an exhaust-gas turbocharger, comprising a turbine rotor which is supported rotatable in a housing, and to which at least one guide vane apparatus forming a radial inlet channel for a medium driving the turbine rotor is allocated, wherein the guide vane apparatus comprises a guide vane mounting ring with a plurality of guide vanes which radially surround the turbine rotor and which are located within the inlet channel, as well as a guide vane cover ring, and wherein the inlet channel is axially bounded by the guide vane mounting ring and the guide vane cover ring, and the guide vane cover ring abuts with a front side facing away from the inlet channel against a support area of the housing. The invention provides that the housing (5) comprises in the support area (15) at least one recess (17) which is open-edged towards the guide vane cover ring (9), and through which the medium can flow.
Furthermore, the invention relates to an exhaust-gas turbocharger, in particular for a motor vehicle, comprising a compressor and a turbine which are actively connected with each other in a mechanical manner.

19 Claims, 2 Drawing Sheets

TURBINE, IN PARTICULAR FOR AN EXHAUST-GAS TURBOCHARGER, AND EXHAUST-GAS TURBOCHARGER

CROSS-REFERENCES TO RELATED APPLICATION

This application claims priority to German patent application DE 10 2008 005 405.4 filed on Jan. 21, 2008, which is hereby incorporated by reference in its entirety.

The invention relates to a turbine, in particular of an exhaust-gas turbocharger, comprising a turbine rotor which is supported rotatable in a housing, and to which at least one guide vane apparatus forming a radial inlet channel for a medium driving the turbine rotor is allocated, wherein the guide vane apparatus comprises a guide vane mounting ring with a plurality of guide vanes which radially surround the turbine rotor and which are located within the inlet channel, as well as a guide vane cover ring, and wherein the inlet channel is axially bounded by the guide vane mounting ring and the guide vane cover ring, and the guide vane cover ring abuts with a front side facing away from the inlet channel against a support area of the housing.

Furthermore, the invention relates to an exhaust-gas turbocharger, in particular for a motor vehicle, comprising a compressor and a turbine which are actively connected with each other in a mechanical manner.

PRIOR ART

Turbines of the above-mentioned type are known. In particular in the motor vehicle construction, exhaust-gas turbochargers are frequently used which serve for increasing performance and torque of an internal combustion engine. The turbine or the turbine rotor, respectively, of such an exhaust-gas turbocharger is driven by an exhaust gas flow of the internal combustion engine and drives a compressor, which in turn compresses in-coming fresh air and pushes it into the cylinders of the internal combustion engine. By compressing the fresh air, the fresh air portion introduced into the cylinders of the internal combustion engine is increased, and thereby the increase of performance and torque is achieved. Since the turbine is driven by the exhaust gas of the internal combustion engine, further aggregates for increasing the filling volume of the cylinders are not necessary.

In the meantime, turbines with so-called variable turbine geometry (VTG) are also known. Such a turbine with variable turbine geometry follows the mode of operation of the Francis turbine and serves for the purpose to be able to better or optimally, respectively, adjust/adapt the power output and the response characteristics at different operating points. To achieve this, adjustable guide vanes are located in the inlet channel of the turbine. Known here is to arrange the adjustable guide vanes on a guide vane mounting ring in such a manner that they radially surround or frame, respectively, the turbine rotor. In most cases, the guide vanes are arranged on the guide vane mounting ring uniformly or equiangular distributed around the circumference of the turbine rotor and spaced apart from the turbine rotor. In some cases, the guide vanes are additionally supported at the guide vane cover ring, wherein the latter then is formed as a guide vane mounting ring as well. The angle of attack of the guide vanes, for example, is adjusted such that with a low throughput of the medium driving the turbine rotor, such as, for example, the exhaust gas of the internal combustion engine, and, at the same time, with a high power requirement, the through-flow cross-section is reduced in the inlet channel so that the medium is directed accelerated onto the turbine vanes, whereby the rotational speed of the turbine and hence the performance of the compressor is increased. Vice versa, with a high throughput of the medium and a low power requirement, the flow velocity of the medium can be reduced by means of a large through-flow cross-section, whereby the performance of the turbine, and hence of the exhaust-gas turbocharger is decreased/reduced. To be able to accurately adjust the inflow cross-section or through-flow cross-section, respectively, of the inlet channel, the inlet channel in which the guide vanes are located, is axially bounded by the guide vane mounting ring at which the guide vanes are arranged, and by a guide vane cover ring which is axially spaced apart from the guide vane mounting ring. Here, the axial distance of the guide vane mounting ring to the guide vane cover ring corresponds substantially to the axial extent of the guide vanes. The use of the guide vane cover ring has the advantage that only the guide vane cover ring has to be made of a high quality material that withstands the high temperatures of the exhaust gas, while the rest of the housing of the turbine can be made of a material of a lower quality. Moreover, the guide vane cover ring separates the guide vane apparatus from the housing of the turbine, wherein deformations and stresses of the housing are not transmitted to the guide vane apparatus. The guide vane cover ring typically abuts with its front side, which faces away from the inlet channel, against a support area of the turbine housing. The support area serves for holding and sealing the guide vane apparatus so that the medium does not flow past the guide vane apparatus. Such a turbine is known, for example, from US 2004/0081567 A1.

DISCLOSURE OF THE INVENTION

According to the invention, it is provided that the housing comprises in the support area at least one recess which is open-edged towards the guide vane cover ring, and through which the medium can flow. The turbine housing's support area abutting against the guide vane cover ring is thus formed in such a manner that it comprises at least one recess through which the medium driving the turbine rotor can flow. Here, the recess is preferably in a fluidic communication with the medium flowing through the inlet channel so that the medium flows through the inlet channel as well as through the recess. For this, the recess is formed open-edged towards the guide vane cover ring so that the medium flowing through the recess or flowing into the recess is in direct contact with the guide vane cover ring or can flow along the guide vane cover ring's front side which faces away from the inlet channel, respectively. The recess has the purpose to achieve a temperature equalization at the guide vane cover ring. The medium which frequently flows in with high temperatures, in particular the inflowing exhaust gas of the internal combustion engine, causes for a conventional turbine with variable turbine geometry that the guide vane cover ring is exposed to a high temperature only at the front side facing towards the inlet channel. This results in that the guide vane cover ring is heated unevenly, in fact substantially on one side only, which results in high stresses and in deformations of the guide vane cover ring. Such deformations are typically taken into account during the design phase of the turbine in that an adequate clearance between the guide vane cover ring's front side facing towards the inlet channel and the guide vanes is provided. The higher the expected deformations are, the bigger this clearance must be chosen. A big clearance or an adequately big gap, respectively, between the guide vane cover ring and the guide vanes, however, results in that the inflow cross-section can not be accurately adjusted any more, or varies depending on the deformation of the guide vane cover ring, respectively. Depending on the temperature gradient, the guide vane clearance can increase or decrease, respectively, in the latter case, the clearance can become too small and can result in jamming of the guide vanes. Hereby the efficiency of the turbine gets worse. By means of the recess according to the invention, which is formed within the support area, and which is open-edged towards the guide vane cover ring, and through which the medium can flow, it can now be achieved that the guide vane cover ring can also be exposed on the front side facing away from the inlet channel with the temperature existing in the inlet channel. Hereby, the deformation of the guide vane cover ring during operation is reduced so that in particular the clearance between the guide vane cover ring and the guide vanes can be chosen smaller, whereby the thermodynamic efficiency of the turbine is improved. Depending on the arrangement and/or the size of the recess, the guide vane cover ring hereby can systematically be exposed to the medium or to the temperature of the medium, respectively. The sealing and holding function of the support area is, of course, still maintained.

Advantageously, a flow can flow into the recess upstream of the guide vanes. In particular when a small through-flow cross-section of the inlet channel is adjusted, by means of the appropriate angle of attack of the guide vanes, the inflowing medium is conveyed into the recess. Preferably, the recess is formed in such a manner that only a small portion of the medium driving the turbine rotor gets into the recess so that the essential, energy-carrying component of the medium is supplied to the turbine rotor. By means of the inflow into the recess upstream of the guide vanes, thus, in spite of the advantageously small portion of the inflowing medium, a sufficient temperature equalization is ensured.

Alternatively or additionally, a flow into the recess is advantageously possible downstream of the guide vanes. It is also thinkable to provide a plurality of recesses. It can be chosen that an inflow is possible into all recesses upstream of the guide vanes, or into all recesses downstream of the guide vanes, or that an inflow is possible into at least one recess upstream of the guide vane, or into at least a different recess downstream of the guide vanes. For this, the recesses can be substantially arranged or formed, respectively, on the same radius of the substantially annular formed support area, or the recesses are arranged on two different radii of the support area so that two recesses can be formed radially one behind the other as well. Hereby the recess located on the outer radius can receive an inflow preferably upstream of the guide vanes, and the recess located on the inner radius can receive an inflow preferably downstream of the guide vanes.

According to an advantageous development of the invention, a plurality of recesses are formed in the support area equiangular distributed across the support area. In other words, the recesses are arranged uniformly distributed across the support area, wherein the recesses each have the same angular distance to one another. Hereby, a particularly uniform exposure of the guide vane cover ring to the medium, and hence a particularly uniform temperature equalization of the guide vane cover ring is achieved. The areas of the support area which do not have recesses, can furthermore be used for supporting and attaching the guide vane cover ring at the turbine housing. Preferably, the recesses are formed in such a manner that the medium does not flow (laterally) past the guide vanes or the guide vane apparatus, respectively. The recesses thus do not form/allow a bypass or leakage path, respectively.

Preferably, the recess or the plurality of recesses, respectively, is formed as an undercut. This means that the recess communicates directly with the inlet channel and, for example, is formed as an indentation in the support area of the turbine housing, whereby the indentation extends beyond the inner and/or outer radius of the guide vane cover ring so that the medium can flow past the guide vane cover ring into the recess or into the undercut, respectively. As an alternative to the formation as an undercut, one or more flow channels can be provided which are in a fluidic connection with the recess and the inlet channel. Hereby, the inlet channel is not limited to the area between guide vane mounting ring and the guide vane cover ring, but also includes the area upstream and downstream of the guide vanes, of the guide vane mounting ring and/or of the guide vane cover ring.

Advantageously, the recess or the undercut extends concentric across the entire support area of the turbine housing. This means that the recess is formed annular and is arranged concentric to the turbine rotor, to the rotational axis of the turbine rotor, and/or to the rotational axis of the guide vane mounting ring and/or the guide vane cover ring, wherein advantageously an annular opening is created through which the medium can flow from the inlet channel into the recess or into the undercut, wherein the opening is preferably part of the recess/the undercut. Hereby, the guide vane cover ring is exposed to the medium over the entire circumference and on both sides. Here it is also thinkable that a plurality of recesses which extend concentric across the entire support area, as already described above, are provided which are arranged radially spaced apart from one another or are formed within the support area, respectively. The outermost and the innermost of these recesses—radially viewed—are each formed according to an advantageous development of the invention as an undercut, as described above.

According to a development of the invention, the recess is formed as a temperature equalization channel. The temperature equalization channel is characterized in that the medium specifically flows through it or is directed through it, respectively, wherein the temperature equalization channel comprises at least one inlet and at least one outlet so that the flow direction of the medium is defined by the temperature equalization channel. For this, the inlet and the outlet of the temperature equalization channel can be arranged upstream and/or downstream of the guide vanes. Thus, it is thinkable, for example, to provide the inlet as well as the outlet of the temperature equalization channel upstream of the guide vanes so that the efficiency of the turbine is increased in that the entire medium is directed through the inlet channel.

Advantageously, the temperature equalization channel forms a circumferential channel. Here, not so much the arrangements of the inlet and the outlet with respect to the guide vanes are of importance, but the arrangement with respect to a circumferential angle of the annular support area. By means of the formation as a circumferential channel, the medium is primarily directed along a radius on the guide vane cover ring. The circumferential channel can extend over a segment of a circular ring or over the entire circumference/circular ring of the support area of the turbine housing along the front side of the guide vane cover ring.

According to a development of the invention, at least one sealing element is arranged between the guide vane cover ring and the turbine housing. The sealing element prevents that the medium flowing into the recess escapes (bypassing) without performing any work on the turbine rotor.

It is further provided that the recess is formed as a resonator. By means of an appropriate shape of the recess formed as a resonator, gas-dynamic effects for the flow in the guide vane apparatus, the turbine and in the turbine rotor can be adjusted.

It is further provided that on the guide vane cover ring and/or on the guide vane mounting ring, at least one spacer is arranged which axially secures the inlet channel. Thus, the spacer secures a minimum width of the inlet channel in its axial extent, in other words, a minimum distance from the guide vane cover ring to the guide vane mounting ring so that, for example, high friction between the guide vanes and the guide vane cover ring and/or the guide vane mounting ring is avoided.

It is further provided that an adjusting ring for adjusting the guide vanes is allocated to the guide vane mounting ring. By turning the adjusting ring, hereby the angle of attack of all guide vanes can be simultaneously changed or adjusted, respectively.

The exhaust-gas turbocharger according to the invention is characterized by a turbine which is formed as described above. The exhaust-gas turbocharger can be used for Otto engines as well as for diesel engines. By means of the advantageous formation of the turbine, an improved thermodynamic of the exhaust-gas turbocharger is achieved. Moreover, the service life of the turbine or the exhaust-gas turbocharger, respectively, is increased since now, due to the reduced deformations and stresses, in particular a friction between the guide vanes and the guide vane cover ring, which can result in an early corrosion, erosion, and/or quick wear of the used materials, is prevented. The recess according to the invention can be incorporated in a simple manner into the support area of the housing. In particular a recess formed as an undercut can be machined in a simple manner into the support area of the housing, for example by milling and/or turning.

BRIEF DESCRIPTION OF THE DRAWINGS

In the following, the invention is to be explained in more detail by means of some figures. In the figures.

EMBODIMENT(S) OF THE INVENTION

Figure 1:
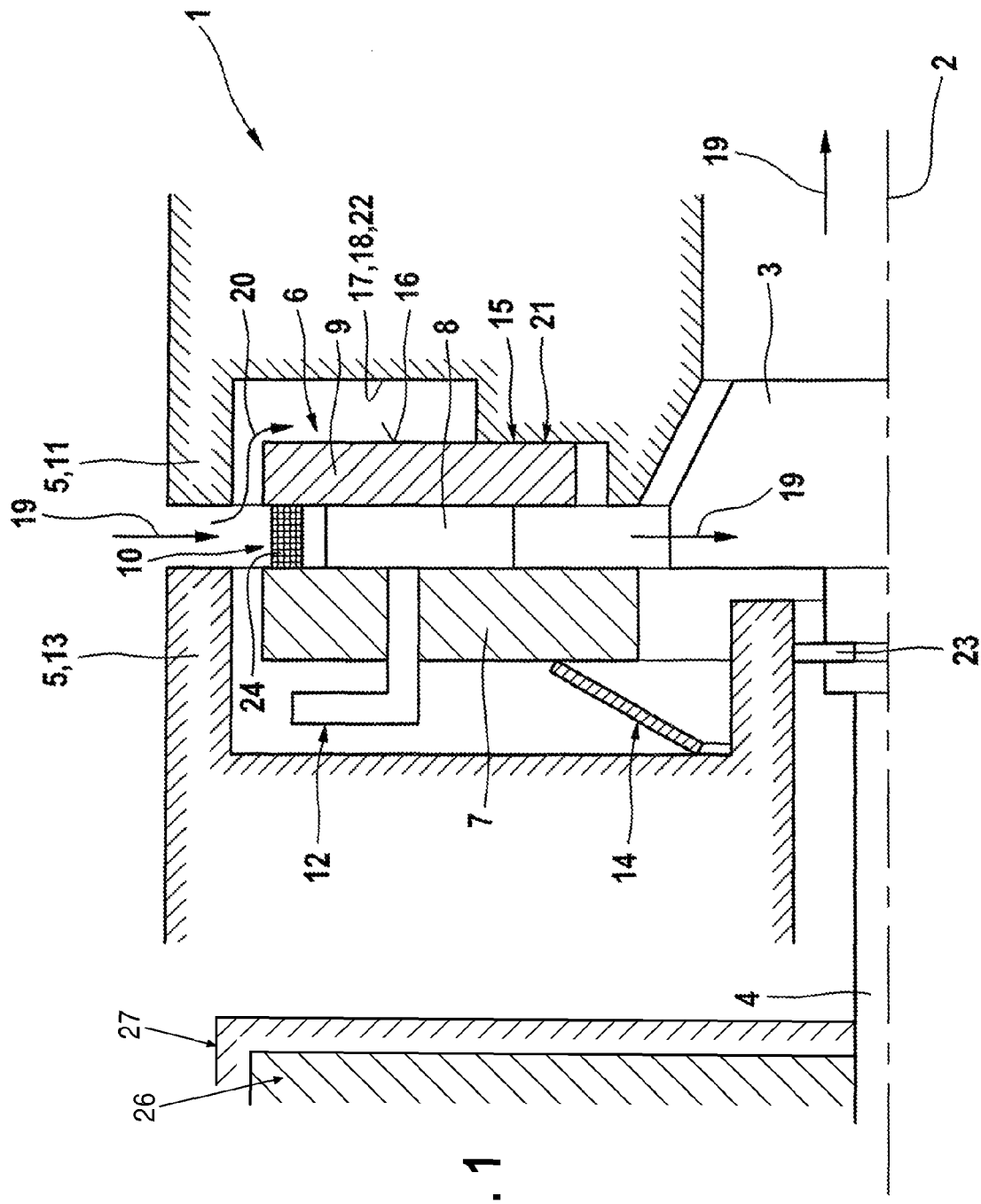
FIG. 1 shows a first exemplary embodiment of a turbine with an advantageous recess in a schematic sectional view.

FIG. 1 shows a first exemplary embodiment of a turbine 1 of an exhaust-gas turbocharger in a schematic sectional view. The turbine comprises a turbine rotor 3 which is turnable/rotatable about a rotational axis 2, and which can be driven by a medium—here the exhaust gas of an internal combustion engine. In FIG. 1, the turbine 1 is illustrated only above the rotational axis 2. The turbine rotor 3 is arranged here on a shaft 4, on which, in addition, a compressor rotor 26 of the exhaust-gas turbocharger is arranged. The turbine 1 comprises further a housing 5, in which the turbine rotor 3 is rotatably mounted. The mounting of the turbine rotor 3 or of the shaft 4, respectively, is not addressed herein in more detail. Furthermore, the turbine 1 comprises a guide vane apparatus 6 which is fluidically arranged upstream of the turbine rotor 3. The guide vane apparatus 6 serves for adapting the power output and the response characteristics of the exhaust-gas turbocharger to different operational conditions. For this, the guide vane apparatus 6 comprises a guide vane mounting ring 7 which is arranged coaxial to the rotational axis 2 of the turbine rotor 3. On the guide vane mounting ring 7, a plurality of adjustable guide vanes 8 are arranged, which are uniformly distributed over the circumference of the turbine rotor 3, and of which, for reasons of clarity, only one is shown in FIG. 1. Of course, a non-uniform distribution of the guide vanes is also thinkable. The guide vanes 8 thus radially surround/frame the turbine rotor 3 or an essential part of the turbine rotor 3, respectively. They are preferably arranged radially spaced to the turbine rotor 3. Furthermore, the guide vane apparatus 6 comprises a guide vane cover ring 9 which is arranged axially spaced to the guide vane mounting ring 7, wherein the distance substantially corresponds to the width of the guide vanes 8. Preferably, the distance is slightly bigger than the width or the axial extent, respectively, of the guide vanes. The difference of the distance to the width of the guide vanes defines the so-called guide vane clearance. To secure a minimal distance between the guide vane mounting ring 7 and the guide vane cover ring 9, advantageously, spacers 24 are provided which are arranged uniformly or non-uniformly distributed on the guide vane mounting ring 7 and/or the guide vane cover ring 9. Here the spacers 24 are formed separate from or integral with the guide vane mounting ring 7 or the guide vane cover ring 9, respectively. The turbine comprises a radial inlet channel 10 for the medium (exhaust gas of the internal combustion engine) driving the turbine rotor 3, wherein the inlet channel is axially bounded by the guide vane mounting ring 7 and the guide vane cover ring 9. The inlet channel 10 extends, as it is typical for radial inlet channels of turbines, over the entire circumference of the turbine 1. For adjusting an inflow cross-section of the inlet channel 10, the guide vanes 8 can be adjusted accordingly with respect to their angle of attack. In the present exemplary embodiment, the guide vanes 8 comprise for this purpose a lever arm 12 which extends through the guide vane mounting ring 7. The lever arm 12 can be actuated, for example, by an adjusting ring which is arranged coaxial to the guide vane mounting ring 7 and is actively connected with the lever arms 12. The adjusting ring, which is not shown here, is arranged on the guide vane mounting ring's 7 side facing away from the inlet channel 10.

In the present exemplary embodiment, the housing 5 is formed in two parts, wherein one part is formed as a turbine housing 11 and the other part as a bearing housing 13, wherein the bearing housing 13 axially adjoins the turbine housing 11. Here, the guide vane apparatus 6 is substantially arranged between the bearing housing 13 and the turbine housing 11. Between the guide vane mounting ring 7 or the guide vane apparatus 6, respectively, and the bearing housing 13, a seal 14 is provided which can alternatively or additionally also be formed as a heat shield, a spring, or the like.

The turbine housing 11 comprises a support area 15 which is substantially annular and which is oriented substantially perpendicular to the rotational axis 2, and against which the guide vane cover ring 9 abuts with its front side 16 facing away from the inlet channel 10. In the support area, the turbine housing 11 comprises a recess 17 which is formed open-edged towards the guide vane cover ring 9, and through which the medium can flow. The recess 17 is formed here as an undercut 18 which extends concentric to the rotational axis 2 across the entire support area 15, wherein the undercut is formed substantially groove-like. The undercut 18 thus is formed annular within the support area 15 of the turbine housing 11, wherein its inner radius is bigger than the inner radius of the guide vane cover ring 9 so that the guide vane cover ring 9 and the support area 15 form a contact face/support face corresponding to the radii difference of the mentioned inner radii, and wherein the outer radius of the undercut 18 is bigger than the outer radius of the guide vane cover ring 9 so that the undercut extends beyond the outer radius of the guide vane cover ring 9, and the medium can flow into the undercut 18 or the recess 17, respectively. The arrows 19 indicate here the typical flow path of the medium. The flow path runs through the inlet channel 10 substantially radial to the turbine rotor 3 and from there axial out of the turbine 1 or the turbine housing 11, respectively. The turbine 1 hence comprises a radial inlet channel 10, and an axial, central outlet channel. By means of the advantageous formation as an undercut 18, the medium can now also deflect along an arrow 20 from the actual flow path (arrow 19) and can flow into the recess 17.

By means of the advantageous recess 17 or the undercut 18, respectively, the guide vane cover ring 9 is not only passed by the medium on its front face 16 facing towards the guide vanes 8 but also on its front side 16 facing away from the inlet channel 10. This has the advantage that, when the medium has a high temperature, the guide vane cover ring 9 is in contact with the medium on both front sides, and is thereby exposed to the temperature of the medium on both sides. Thereby, the deformations which would occur due to a one-sided temperature exposure of the guide vane cover ring—as in the prior art—are prevented or at least reduced. This results in that an (axial) clearance, which naturally has to be adjusted between the guide vanes 8, the guide vane cover ring 9, and/or the guide vane mounting ring 7 so that the guide vanes 8 can be moved and no high friction between the guide vanes and the guide vane cover ring 9 occurs, can be dimensioned smaller. Thereby, the thermodynamic efficiency of the turbine 1 is improved. In addition, the assembly or the fastening, respectively, of the guide vane apparatus 6 or the guide vane cover ring 9, respectively, is made simpler since the latter does not deform any more due to an unbalanced temperature load. Because of the reduced deformations as well as the associated reduced stresses in the guide vane cover ring 9, and the reduced friction values, the service life of the turbine 1 or of the exhaust-gas turbocharger, respectively, is increased. By means of the reduced friction values, in particular corrosion, erosion, and/or wear of the guide vane cover ring 9, of the guide vanes 8, and/or of the guide vane mounting ring 7 is prevented in the contact area.

Due to the formation of the recess 17 as an undercut 18, the medium flows in and out of the recess 17 through the same opening. To avoid that the medium flows out of the recess past the guide vanes 8, advantageously a seal 21 is provided between the front side 16 of the guide vane cover ring 9 and the support area 15 of the turbine housing 5.

Figure 2:
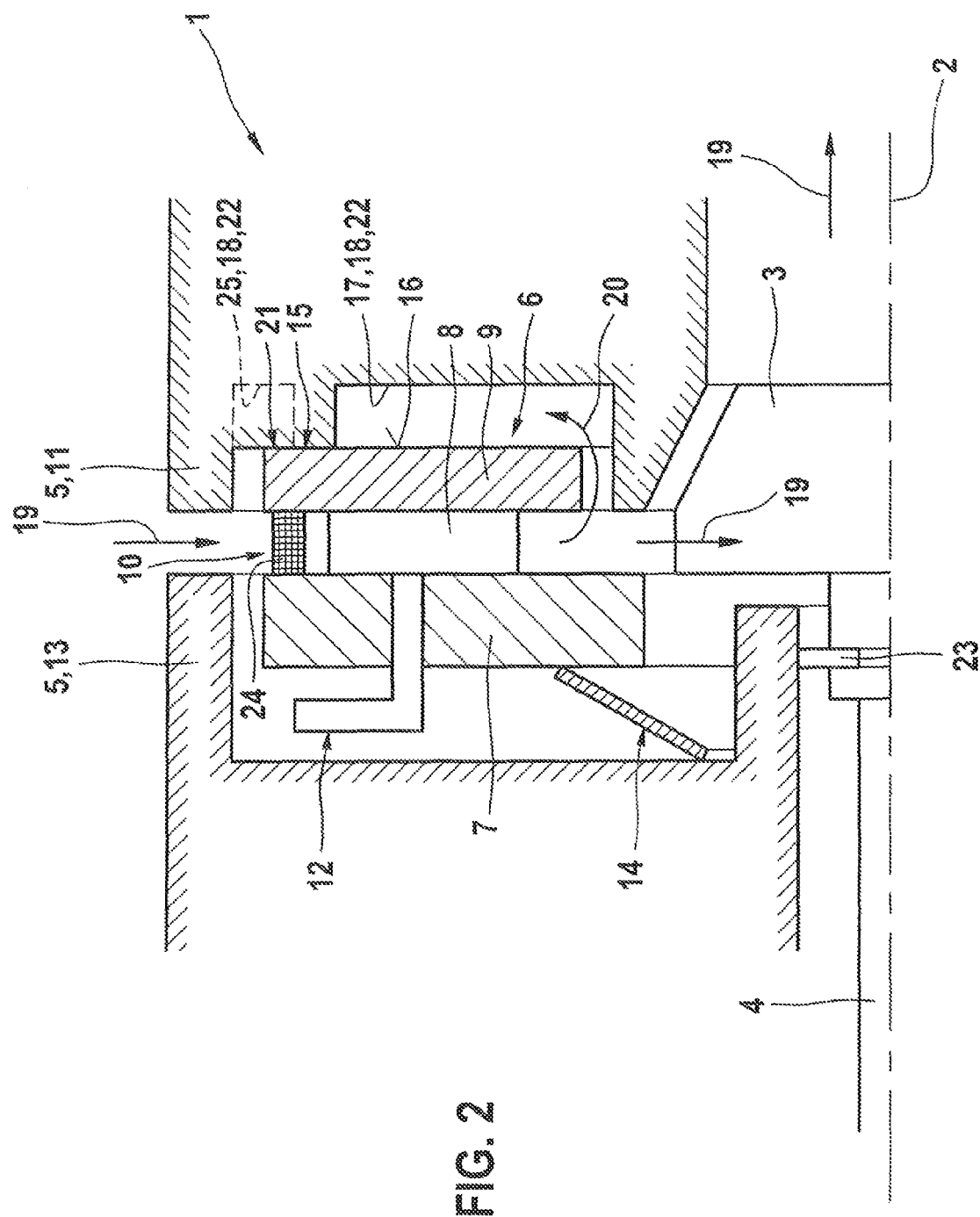
FIG. 2 shows a second exemplary embodiment of a turbine in a schematic cross-sectional view.

FIG. 2 shows a second exemplary embodiment of the turbine 1 which is slightly different from the preceding exemplary embodiment so that elements in FIG. 2 known from FIG. 1 are not explained again. The essential difference of the second exemplary embodiment lies in the arrangement of the undercut 18. While in the first exemplary embodiment of FIG. 1, a flow can flow into the recess 17 or the undercut 18, respectively, upstream of the guide vanes 8, in the second exemplary embodiment is provided that the medium can flow into recess 17 or the undercut 18, respectively, downstream of the guide vanes 8. This means that in the second exemplary embodiment, the outer radius of the undercut 18 is smaller than the outer radius of the guide vane cover ring 9, and the inner radius of the undercut 18 is smaller than the inner radius of the guide vane cover ring 9. Hence, the undercut 18 or the recess 17, respectively, and the inlet channel 10 are fluidically interconnected downstream of the guide vanes 8.

Of course, still further embodiments of the invention are thinkable. For example, the recess 17 can be formed as a temperature equalization channel, or multiple, in particular equally dimensioned recesses 17 can be arranged or formed, respectively, equiangular distributed across the support area 15, wherein the turbine housing's 11 areas abutting against the guide vane cover ring 9 can be provided with means for fastening the guide vane cover ring 9.

It is also thinkable to provide recesses 17 which are formed radially spaced apart from each other within the support area 15, and through which the medium can flow. FIG. 2 shows here for illustration purposes, as an option to the above-described recess in which a flow can flow-in downstream of the guide vanes 8, a recess 25 which is illustrated in dotted lines, in which a flow can flow-in upstream of the guide vanes 8, and which is formed as an undercut 18 as well.

Advantageously, the recess 17 is (or the recesses 17 are) formed as a resonator 22 so that gas-dynamic effects for the flowing medium are adjustable in the guide vane apparatus 6 and/or in the turbine rotor 3. A seal 23 between the bearing housing 13 and the shaft 4 ensures that the medium can not get from the turbine 1 of the exhaust-gas turbocharger into the bearing housing 13 or into the compressor 27 axially adjoining the turbine 1, respectively.

The invention claimed is:

1. A turbine, comprising:
   a housing including a support area;
   a turbine rotor which is supported rotatably in the housing,
   at least one guide vane apparatus included with the turbine rotor, the at least one guide vane apparatus forming a radial inlet channel for a medium driving the turbine rotor,
   a guide vane mounting ring included with the at least one guide vane apparatus, the guide vane mounting ring including a plurality of guide vanes which radially surround the turbine rotor and which are located within the inlet channel,
   a guide vane cover ring included with the guide vane mounting ring, the guide vane cover ring including a front side, wherein the inlet channel is axially bounded by the guide vane mounting ring and the guide vane cover ring, and the guide vane cover ring abuts with the front side facing away from the inlet channel against the support area of the housing, and
   at least one recess included in the support area of the housing, wherein the at least one recess is open-edged towards the guide vane cover ring, and through which the medium flows, wherein the recess is a resonator.

2. The turbine according to claim 1, wherein the medium flows into the at least one recess upstream of the guide vanes.

3. The turbine according to claim 1 wherein the medium flows into the at least one recess downstream of the guide vanes.

4. The turbine according to claim 1 wherein the support area is substantially annular.

5. The turbine according to claim 1 wherein within the support area, a plurality of recesses are formed distributed equiangular across the support area.

6. The turbine according to claim 1 wherein the recess is an undercut.

7. The turbine according to claim 1 wherein the recess extends concentrically across the entire support area.

8. The turbine according to claim 1 wherein the recess is a temperature equalization channel.

9. The turbine according to claim 1 wherein between the guide vane cover ring and the housing at least one seal is arranged.

10. The turbine according to claim 1 wherein at least one of the guide vane cover ring and the guide vane mounting ring has at least one spacer arranged which axially secures the inlet channel.

11. The turbine according to claim 1 wherein an adjusting ring for adjusting the guide vanes is allocated to the guide vane mounting ring.

12. An exhaust-gas turbocharger, comprising:
a compressor;
a turbine actively connected with the compressor mechanically, the turbine including:
a housing including a support area,
a turbine rotor which is supported rotatably in the housing,
at least one guide vane apparatus included with the turbine rotor, the at least one guide vane apparatus forming a radial inlet channel for a medium driving the turbine rotor,
a guide vane mounting ring included with the at least one guide vane apparatus, the guide vane mounting ring including a plurality of guide vanes which radially surround the turbine rotor and which are located within the inlet channel,
a guide vane cover ring included with the guide vane mounting ring, the guide vane cover ring including a front side, wherein the inlet channel is axially bounded by the guide vane mounting ring and the guide vane cover ring, and the guide vane cover ring abuts with the front side facing away from the inlet channel against the support area of the housing, and
at least one recess included in the support area of the housing, wherein the at least one recess is open-edged towards the guide vane cover ring, and through which the medium flows, wherein the recess is a resonator.

13. The exhaust-gas turbocharger according to claim 12, wherein the compressor comprises a compressor rotor which is actively connected mechanically with the turbine rotor of the turbine.

14. The exhaust-gas turbocharger according to claim 12 wherein the compressor rotor and the turbine rotor are arranged on an exhaust-gas turbocharger shaft.

15. The turbine according to claim 12, wherein the medium flows into the at least one recess upstream of the guide vanes.

16. The turbine according to claim 12, wherein the medium flows into the at least one recess downstream of the guide vanes.

17. The turbine according to claim 2, wherein the support area is substantially annular.

18. The turbine according to claim 12, wherein the support area is substantially annular.

19. A turbine, comprising:
a housing including a support area;
a turbine rotor which is supported rotatably in the housing,
at least one guide vane apparatus included with the turbine rotor, the at least one guide vane apparatus forming a radial inlet channel for a medium driving the turbine rotor,
a guide vane mounting ring included with the at least one guide vane apparatus, the guide vane mounting ring including a plurality of guide vanes which radially surround the turbine rotor and which are located within the inlet channel,
a guide vane cover ring included with the guide vane mounting ring, the guide vane cover ring including a front side, wherein the inlet channel is axially bounded by the guide vane mounting ring and the guide vane cover ring, and the guide vane cover ring abuts with the front side facing away from the inlet channel against the support area of the housing, and
at least one recess included in the support area of the housing, wherein the at least one recess is a temperature equalization channel and open-edged towards the guide vane cover ring, and through which the medium flows.

* * * * *